United States Patent
Akai et al.

(10) Patent No.: US 8,823,915 B2
(45) Date of Patent: Sep. 2, 2014

(54) LIQUID CRYSTAL DISPLAY PANEL

(75) Inventors: Yoshihiro Akai, Tottori (JP); Masayuki Kametani, Tottori (JP); Takayuki Kato, Tottori (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 379 days.

(21) Appl. No.: 13/027,405

(22) Filed: Feb. 15, 2011

(65) Prior Publication Data

US 2011/0205477 A1  Aug. 25, 2011

(30) Foreign Application Priority Data

Feb. 22, 2010 (JP) .................................. 2010-035758

(51) Int. Cl.
*G02F 1/1339* (2006.01)
*G02F 1/1333* (2006.01)
*G02F 1/1343* (2006.01)

(52) U.S. Cl.
CPC ........ *G02F 1/1333* (2013.01); *G02F 1/133371* (2013.01); *G02F 2001/134372* (2013.01); *G02F 2202/02* (2013.01); *G02F 1/133345* (2013.01); *G02F 1/1339* (2013.01)
USPC ............................ 349/154; 349/138; 349/153

(58) Field of Classification Search
USPC ......................................... 349/138, 153–154
See application file for complete search history.

(56) References Cited

U.S. PATENT DOCUMENTS

| | | | |
|---|---|---|---|
| 8,169,558 B2 | 5/2012 | Morimoto et al. | |
| 2003/0071955 A1* | 4/2003 | Nakayoshi et al. | 349/154 |
| 2008/0137022 A1* | 6/2008 | Komeno et al. | 349/153 |
| 2008/0204639 A1* | 8/2008 | Wada | 349/114 |
| 2008/0225222 A1* | 9/2008 | Ueda | 349/154 |
| 2009/0046230 A1 | 2/2009 | Sakurai et al. | |
| 2009/0126551 A1 | 5/2009 | Takamatsu et al. | |
| 2011/0000705 A1 | 1/2011 | Moriwaki | |

FOREIGN PATENT DOCUMENTS

| | | |
|---|---|---|
| JP | 2007-226273 | 9/2007 |
| JP | 2008-068623 | 3/2008 |
| JP | 2009-036800 | 2/2009 |
| JP | 2009-047839 | 3/2009 |
| JP | 2010-014794 | 1/2010 |
| WO | 2009/110136 | 9/2009 |

* cited by examiner

*Primary Examiner* — Bumsuk Won
*Assistant Examiner* — Charles Chang
(74) *Attorney, Agent, or Firm* — K&L Gates LLP (57) ABSTRACT

Disclosed herein is a liquid crystal display panel in which circumferences of a pair of substrates disposed so as to face each other are stuck at a given distance to each other by a seal material, a liquid crystal inlet is formed in a part of the seal material, and a liquid crystal is sealed in an inner space defined between the substrates paired with each other, the liquid crystal display panel including a resin film being formed on the inner space side of one of the pair of substrates, and an inorganic insulating film being formed on a surface side of the resin film. An area not having the inorganic insulating film being present therein is formed in the liquid crystal panel.

6 Claims, 10 Drawing Sheets

LIQUID CRYSTAL DISPLAY PANEL

CROSS REFERENCES TO RELATED APPLICATIONS

The present application claims priority to Japanese Priority Patent Application JP 2010-035758 filed in the Japan Patent Office on Feb. 22, 2010, the entire content of which is hereby incorporated by reference.

BACKGROUND

The present application relates to a liquid crystal display panel having a liquid crystal inlet, and more particularly to a liquid crystal display panel in which a low temperature insulating film is formed after completion of formation of a resin film.

A liquid crystal display panel is used as a display panel in many electronic apparatuses because the liquid crystal display panel has the features such as light weight, slimness and low power consumption as compared with a Cathode Ray Tube (CRT). The liquid crystal display panel is such that an alignment of liquid crystal molecules arranged in a predetermined direction is changed by application of an electric field to change an amount of light transmitted through a liquid crystal layer, thereby displaying an image on the liquid crystal display panel. With regard to such a liquid crystal display panel, reflection type one, transmission type one, and semi-transmission type one including both the reflection type one and the transmission type one exist. In this case, in the reflection type liquid crystal display panel, an outside light is made incident to a liquid crystal layer, and is reflected by a reflective plate to be transmitted through the liquid crystal layer again to be emitted. Also, in the transmission type liquid crystal display panel, an incident light radiated from a backlight unit is transmitted through a liquid crystal layer.

A longitudinal electric field system and a transverse electric field system are known as those used in a method of applying an electric field to a liquid crystal layer of the liquid crystal display panel. With the liquid crystal display panel using the longitudinal electric field system, an electric field directed approximately in the longitudinal direction is applied to liquid crystal molecules through a pair of electrodes disposed so as to hold the liquid crystal layer between the paired electrodes. A liquid crystal display panel having a Twisted Nematic (TN) mode, a liquid crystal display panel having a Vertical Alignment (VA) mode, a liquid crystal display panel having a Multi-domain Vertical Alignment (MVA) mode or the like is known as the liquid crystal display panel using the longitudinal electric field system. With the liquid crystal display panel using the transverse electric field system, a pair of electrodes is provided in an inner surface side of one of a pair of substrates disposed so as to hold the liquid crystal layer between the paired substrates with the paired electrodes being insulated from each other. Also, an electric field directed approximately in the transverse direction is applied to the liquid crystal molecules. A liquid crystal display panel having an In-Plane Switching (ISP) mode in which a pair of electrodes does not overlap in terms of planar view, and a liquid crystal display panel having a Fringe Field Switching (FFS) mode in which a pair of electrodes overlaps in terms of planar view are known as the liquid crystal display panel using the transverse electric field system.

Of them, in the liquid crystal display panel having the IPS mode, a pair of electrodes composed of a pixel electrode and a common electrode is formed in a pectinate shape so that the paired electrodes are engaged with each other with the paired electrodes being electrically insulated from each other. Also, the transverse electric field is applied across the pixel electrode and the common electrode. The liquid crystal display panel having the IPS mode has such an advantage that its view angle is wider than that of the liquid crystal display panel having the longitudinal electric field.

In the liquid crystal display panel having the FFS mode, a pair of electrodes is composed of a common electrode and a pixel electrode. Also, pairs of common electrodes and pixel electrodes are disposed in different layers, respectively, through an insulating film. A slit-like opening is provided either in the common electrode or in the pixel electrode on the liquid crystal layer side, and the electric field oriented approximately in the transverse direction and passing through the slit-like opening is applied to the liquid crystal layer. The liquid crystal display panel having the FFS mode has been used recently in many cases because the liquid crystal display panel having the FFS mode has an effect that the wide view angle can be obtained and also the image contrast can be improved.

With regard to the liquid crystal display panel having the FFS mode, a liquid crystal display panel is known in which as disclosed in FIG. 2 of Japanese Patent Laid-Open No. 2009-036800 (Patent Document 1), a pixel electrode is formed approximately on the same plane as that of a Thin Film Transistor (TFT) serving as a switching element. Also, a liquid crystal panel is known in which as disclosed in FIG. 2 of Japanese Patent Laid-Open No. 2009-047839 (Patent Document 2), both a common electrode and a pixel electrode are disposed above a TFT.

Among these, in the liquid crystal panel having the FFS mode in which both the common electrode and the pixel electrodes are disposed above the TFT, a surface of the TFT and the like is covered with an interlayer film made of an acrylic resin or the like. A lower electrode made of a transparent conductive material is formed on a surface of the interlayer film. Also, an upper electrode is formed on a surface of the lower electrode sandwiching an inorganic insulating film. The lower electrode can be operated as any of the pixel electrode and the common electrode. The interlayer film planarizes the irregularities of the TFT and the like, and both the upper and lower electrodes can be formed above the TFT, which results in an increased aperture ratio.

SUMMARY

Figure 10:
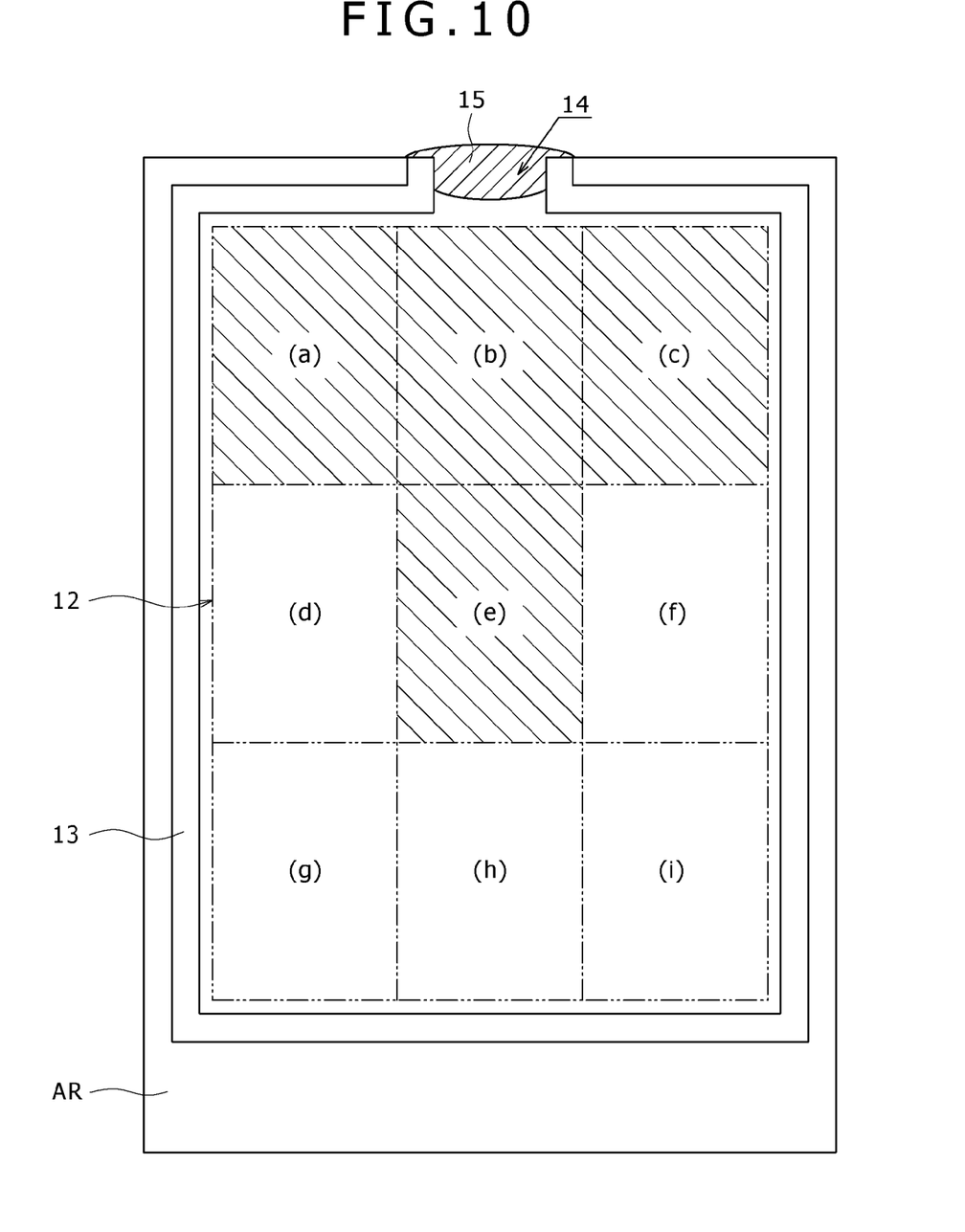
FIG. 10 is a top plan view showing a distribution of foreign matters in an existing liquid crystal display panel.

However, in the liquid crystal panel having the FFS mode in which both the common electrode and the pixel electrodes are disposed above the TFT, a minute bright point defect was generated within a display area in some cases. The cause of generation of the minute bright point defect was investigated, and as a result, it became clear that the generation of the minute bright point defect is due to presence of a foreign matter lying within the display area. As shown in FIG. 10, a display area 12 is divided into nine areas (a) to (i) of three in length×three in width, and a distribution of foreign matters is investigated. As a result, it becomes clear that the area (b) closest to a liquid crystal inlet 14 has the largest number of foreign matters, and each of the areas (a) to (c) and (e) has the second-largest number of foreign matters. Thus, a rate of the number of foreign matters which the areas (a) to (c) and (e) have is equal to or more than 80%. From this investigation result, it was guessed that almost the foreign matters invade from the liquid crystal inlet 14. In addition, specimens of the foreign matters were subjected to energy dispersion X-ray spectroscopy (EDS), and as a result, it was proved that many foreign matters were a silicon nitride as a material for the inorganic insulating film.

The liquid crystal inlet portion, as disclosed in Japanese Patent Laid-Open No. 2008-068623 (Patent Document 3), is formed in a cutting-off process using scribe system. In addition, the interlayer film made of the acrylic resin or the like is weak against heat. Thus, the inorganic insulating film made of either a silicon nitride or a silicon oxide on the interlayer film is formed at a lower temperature than a normal formation temperature. For this reason, the inorganic insulating film is referred to as "a low temperature insulating film" as well. With regard to the cause of the minute bright point defect described above, it is thought that since the inorganic insulating film is formed at a low temperature, an adhesion strength between the interlayer film and the inorganic insulating film is reduced, the inorganic insulating film is peeled off in a phase of the cutting-off of the liquid crystal inlet portion carried out by using the scribe system, and nibbles of the inorganic insulating film invade together with the liquid crystal from the liquid crystal inlet into the display area.

The present application has been made in order to solve the problems described above, and it is therefore desirable to provide a liquid crystal panel in which nibbles of an inorganic insulating film formed on an interlayer film are hardly generated, thereby reducing generation of minute bright point defects.

In order to attain the desire described above, according to an embodiment, there is provided a liquid crystal display panel in which circumferences of a pair of substrates disposed so as to face each other are stuck at a given distance to each other by a seal material, a liquid crystal inlet is formed in a part of the seal material, and a liquid crystal is sealed in an inner space defined between the substrates paired with each other. In this case, a resin film is formed on the inner space side of one of the pair of substrates, and an inorganic insulating film is formed on a surface side of the resin film; and an area not having the inorganic insulating film being present therein is formed in the liquid crystal panel.

When the inorganic insulating film is formed on the surface side of the resin film, for the purpose of preventing thermal deterioration and a characteristic change of the resin film from being caused, the inorganic insulating film is formed at a lower temperature than that in a normal formation condition of an inorganic insulating film. For this reason, the inorganic insulating film formed on the surface side of the resin film is inferior in a property of adhesion between the resin film or other insulating film and the inorganic insulating film. Therefore, if the same inorganic insulating film as that formed on the surface side of the resin film is present on the liquid crystal inlet side, the rubbles of the inorganic insulating film invade together with the liquid crystal into the display area when the liquid crystal is injected after each of the liquid crystal display panels is separated from a mother substrate in the cutting-off process. As a result, the possibility that the minute bright point defects are generated is increased.

However, according to the liquid crystal display panel of the embodiment, the area is formed in which the same inorganic insulating film as that formed on the surface side of the resin film is absent. As a result, the minute bright point defects are hardly generated because the nibbles of the same inorganic insulating film as that formed on the surface side of the resin film in the phase of the injection of the liquid crystal hardly invade into the display area side.

Preferably, the area not having the inorganic insulating film being present therein is an end portion corresponding to the liquid crystal inlet.

In the liquid crystal display panel of the embodiment, the area not having the inorganic insulating film being present therein is formed in the end portion corresponding to the liquid crystal inlet of the liquid crystal display panel. For this reason, the nibbles of the inorganic insulating film hardly invade into an area closest to the liquid crystal inlet as an area into which the rubbles of the inorganic insulating film most invade. As a result, the minute bright point defects are hardly generated in this area.

Preferably, the area not having the inorganic insulating film being present therein is formed over a predetermined given width from the end portion of the liquid crystal inlet.

The position shift of the wheel cutter for grinding the grooves for cutting-off of the liquid crystal display panel areas from the mother substrate, for example, is controlled so as to become up to 120 μm. In the liquid crystal display panel of the embodiment, a width of the area in which the same inorganic insulating film as that formed on the surface side of the resin film is not formed is set as being larger than the predetermined given width from the side on the liquid crystal inlet side, for example, set as being larger than 120 μm as a maximum value of the tolerance of the position shift of the wheel cutter. As a result, even if the position shift of the wheel cutter becomes up to 120 μm when each of the liquid crystal display panel is cut from the mother substrate, the rubbles of the inorganic insulating film can be prevented from being generated because the wheel cutter does not touch the inorganic insulating film at all.

Preferably, the resin film is not formed in a side on the liquid crystal inlet side of the liquid crystal display panel.

In the case where the resin film is not formed in the side corresponding to the liquid crystal inlet side of the liquid crystal display panel, even when the same inorganic insulating film as that formed on the surface side of the resin film is formed in this portion, the adhesiveness of the inorganic insulating film is more superior for this portion than for the resin film. For this reason, according to the liquid crystal display panel of the embodiment, especially, the effect described above is satisfactorily offered.

In addition, preferably, a width of a portion not having the resin film formed therein is wider than that of the area not having the inorganic insulating film being present therein from the side on the liquid crystal inlet side.

In the case where the width of the portion not having the resin film formed therein is made wider than that of the area not having the inorganic insulating film being present therein from the side on the liquid crystal inlet side, when the same inorganic insulating film as that formed on the surface side of the resin film is formed in this portion, the inorganic insulating film comes to contact a portion other than the resin film. The inorganic insulating film has the superior adhesiveness for a portion other than the resin film. Therefore, when the width of the portion not having the resin film formed therein, for example, is made 80 μm or more wider than that of the area not having the inorganic film being present therein, even if the position shift of the wheel cutter reaches up to 120 μm, the nibbles of the inorganic insulating film are hardly generated because the wheel cutter hardly contacts the inorganic insulating film on the resin film. It is noted that in the liquid crystal display panel of the embodiment, the rubbles of the inorganic insulating film are hardly generated as the width of the portion not having the resin film formed therein is made larger. However, when the width of the portion not having the resin film formed therein is made too large, the formation area for the resin film becomes narrow. Therefore, the width of the portion not having the resin film formed therein has to be set as a suitable value in terms of the experiments.

Also, preferably, a lower electrode, the inorganic insulating film and an upper electrode are formed in this order on said resin film in the liquid crystal display panel, and the liquid crystal display panel operates in an FFS mode.

As a result, the present application can be applied to the liquid crystal display panel having the FFS mode in which the liquid crystal display panel has the resin film and the aperture ratio is large.

Additional features and advantages are described herein, and will be apparent from the following Detailed Description and the figures.

DETAILED DESCRIPTION

Embodiments of the present application will be described below in detail with reference to the drawings.

However, embodiments which will be described below are not intended to limit the present application to the contents described herein, and thus the present application is equally applied to various kinds of changes made without departing from the technical idea disclosed in the appended claims. It is noted that "a surface" in each of an array substrate and a color filter substrate stated herein means either a surface on which various kinds of wirings are formed or a surface on a side facing a liquid crystal. In addition, in the drawings used for the description in this specification, for the purpose of drawing layers and members in such sizes that they can be recognized on the drawings, the layers and the members are drawn on different scale sizes, respectively, and thus are not necessarily drawn in proportion to their actual sizes.

First Embodiment

Figure 1:
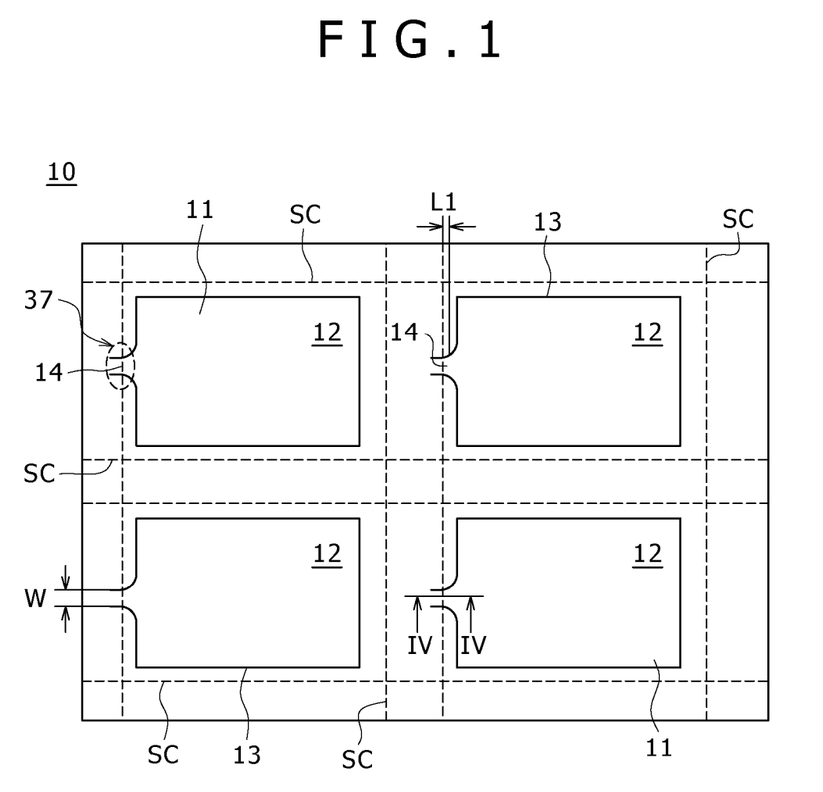
FIG. 1 is a top plan view showing an outline of an array substrate of a mother substrate before a liquid crystal display panel according to a first embodiment is obtained through cutting-off.

A structure of a main portion of a liquid crystal display panel according to a first embodiment will now be described with reference to FIGS. 1 to 4. The liquid crystal display panel of the first embodiment operates in an FFS mode using a Low Temperature Poly Silicon (LTPS) TFT. As shown in FIG. 1, four liquid crystal display panel formation areas 11 of two in length×two in width are formed in a mother substrate 10. Although actually, a greater number of liquid crystal display panel formation areas 11 are simultaneously formed, the four liquid crystal display panel formation areas 11 are illustrated herein in an easy-to-understood manner.

In each of the four liquid crystal display panel formation areas 11 of the mother substrate 10, a liquid crystal inlet 14 is formed by a seal material 13 applied so as to surround a display area 12. Also, an array substrate AR and a color filter substrate CF (refer to FIG. 3) are bonded to each other, thereby defining an air space between the array substrate AR and the color filter substrate CF. The wheel cutter as shown in Patent Document 3 is moved along a scribe line SC shown in FIG. 1 to form a groove, and a stress is applied to the mother substrate 10, thereby cutting the mother substrate 10 into the four liquid crystal display panels 11A.

Figure 3:
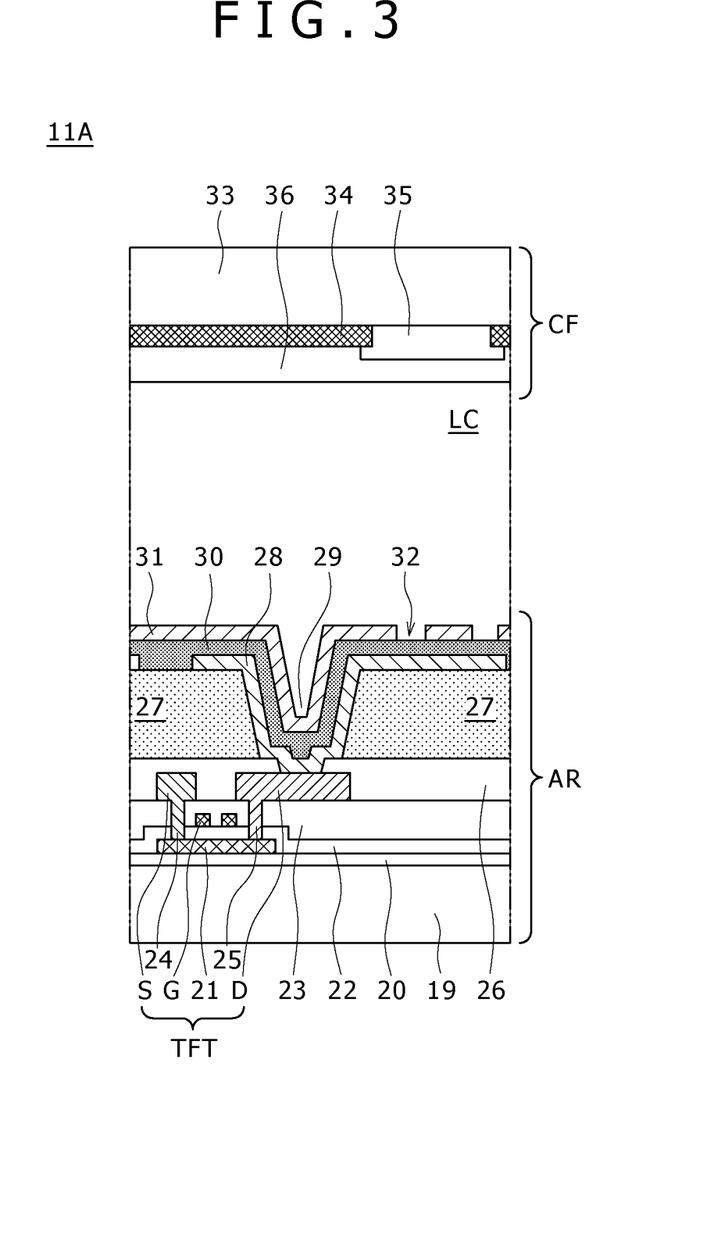
FIG. 3 is a cross sectional view taken on line III-III of FIG. 2.
Figure 4:
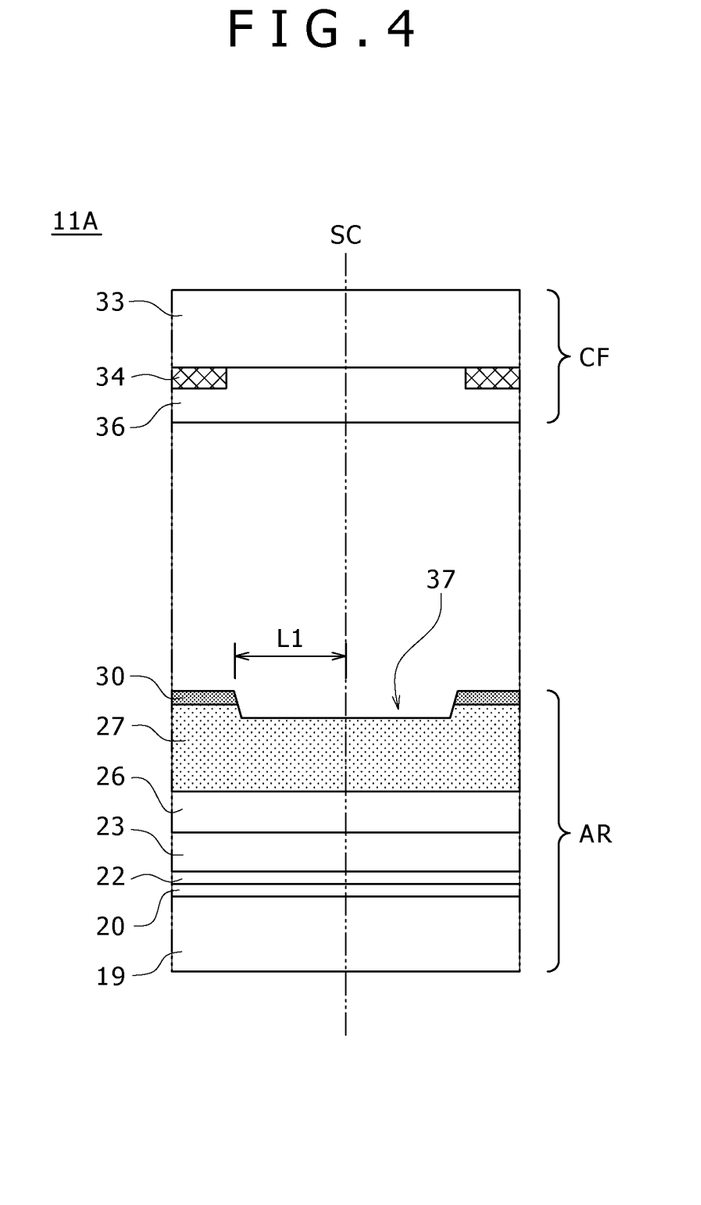
FIG. 4 is a cross sectional view taken on line IV-IV of FIG. 1.

As shown in FIGS. 3 and 4, in the liquid crystal panel 11A, a liquid crystal layer LC is sandwiched between an array substrate AR and the color filter substrate CF. In the liquid crystal panel 11A cut from the mother substrate 10, a liquid crystal is injected from a liquid crystal inlet 14 into the air space, and the liquid crystal inlet 14 is then sealed with a seal material. It is noted that although an illustration is omitted, columnar spacers for holding the liquid crystal layer LC to have a predetermined thickness are formed either on the color filter substrate CF or on the array substrate AR.

Figure 2:
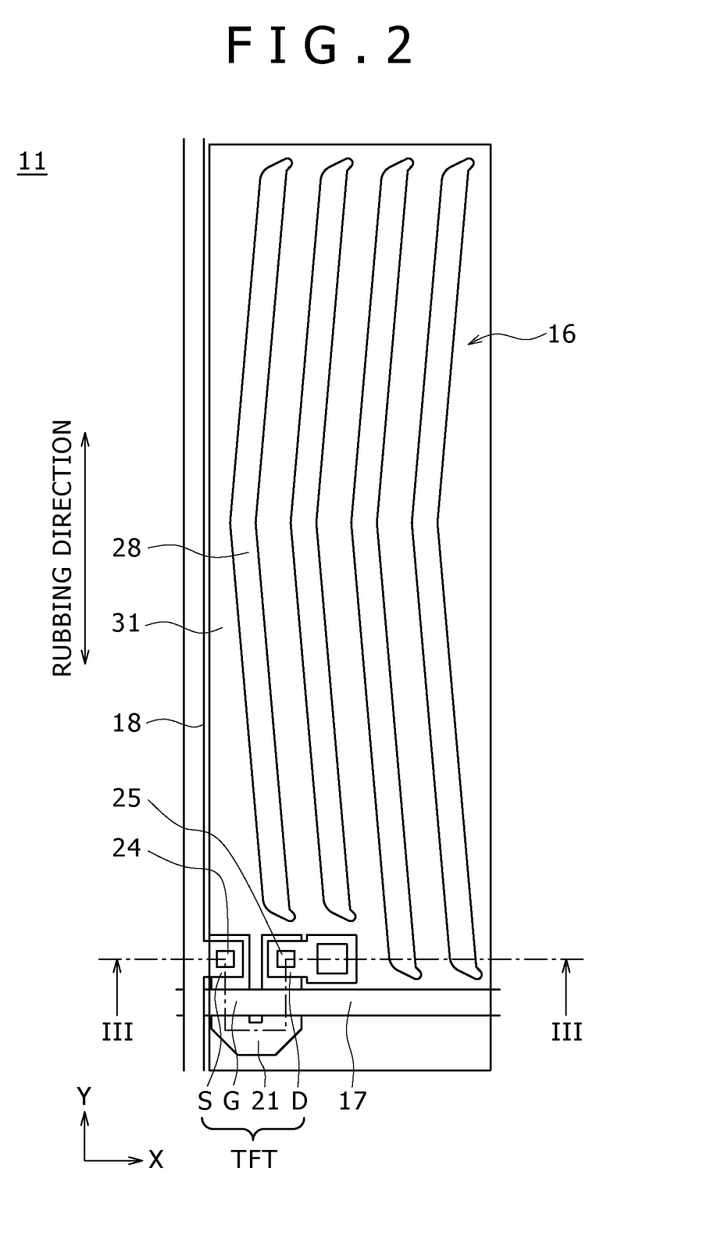
FIG. 2 is a top plan view showing one sub-pixel of the liquid crystal display panel according to the first embodiment.

In addition, the liquid crystal panel 11A has plural pixels disposed in a row direction and in a column direction in the display area 12. One pixel, for example, is composed of three sub-pixels for display of three primary colors of Red (R), Green (G) and Blue (B). Also, a color of corresponding one of the pixels is determined based on a mixed color of lights having R, G and B, respectively. As shown in FIG. 2, the sub-pixel 16 in the array substrate AR includes a scanning line 17, a signal line 18, and a thin film transistor TFT. In this case, the scanning line 17 is made of an opaque metal such as aluminum or molybdenum, and extends in the X-axis direction. The signal line 18 is made of an opaque metal such as aluminum or molybdenum, and extends in the Y-axis direction. Also, the thin film transistor TFT is disposed in the vicinity of an intersection portion between the scanning line 17 and the signal line 18.

The array substrate AR has a first transparent substrate 19 made of a glass, quartz, a plastic or the like which is transparent and has an insulating property as a base. A buffer film 20 is laminated on a surface of a first transparent substrate 19. A semiconductor layer 21 made of low temperature poly silicon is formed in a U letter-like shape in terms of planar view on a surface of the buffer film 20. A transparent gate insulating film 22, for example, made of a silicon nitride, a silicon oxide or the like is laminated so as to cover both the semiconductor layer 21 and the buffer film 20. The scanning line 17 is formed on a surface of the gate insulating film 22 so as to bisect at right angles with each of two arms of the U letter-like shape of the semiconductor layer 21 in terms of the planar view. Two portions of the scanning line 17 in each of which the scanning line 17 overlaps the semiconductor layer 21 becomes a gate electrode G.

An interlayer insulating film 23 made of a silicon nitride, a silicon oxide or the like is formed so as to cover both the scanning line 17 and the gate insulating film 22. The signal line 18, for example, made of a metal such as aluminum or molybdenum is formed in the Y-axis direction (in the column direction) of FIG. 2 on a surface of the interlayer insulating film 23. A source electrode S extends from the signal line 18. The source electrode S is electrically connected to one of the two arms of the U letter-like shape of the semiconductor layer 21 through a contact hole 24 for the source electrode S which extends completely through both the interlayer insulating film 23 and the gate insulating film 22.

In addition, a drain electrode D, for example, made of a metal such as aluminum or molybdenum is formed on a surface of the interlayer insulating film 23. The drain electrode D is electrically connected to the other of the two arms of the U letter-like shape of the semiconductor layer 21 through a contact hole 25 for the drain electrode D which extends completely through both the interlayer insulating film 23 and the gate insulating film 22. A passivation film 26, for example, made of a silicon nitride, a silicon oxide or the like is formed so as to cover all the signal line 18, the source electrode S, and the drain electrode D. The thin film transistor TFT serving as a switching element is composed of the gate electrode G, the gate insulating film 22, the semiconductor layer 21, the source electrode S, and the drain electrode D. Also, the thin film transistors TFT are formed in the respective sub-pixels 11.

Areas which are measured by the scanning line 17 and the signal line 18 become the sub-pixel areas, respectively. The three sub-pixels 11 for display of R, G and B compose one pixel (not shown) having approximately a square shape. Thus, each of the sub-pixels 11 which are obtained by trisecting one pixel has a rectangular shape in which the scanning line 12 side is a short side, and the signal line 13 side is a long side.

Also, an interlayer resin film 27, for example, made of a transparent resin material such as an acrylic resin or a photo resist is laminated so as to cover the passivation film 26. Also, a lower electrode 28 made of a transparent conductive material such as an Indium Tin Oxide (ITO) or an Indium Zinc Oxide (IZO) is formed so as to cover the interlayer resin film 27. A contact hole 29 for a pixel electrode is formed so as to extend completely through both the interlayer resin film 27 and the passivation film 26 to reach the drain electrode D. The lower electrode 28 and the drain electrode D are electrically connected to each other through the contact hole 29 for the pixel electrode. For this reason, the lower electrode 28 operates as the pixel electrode.

A transparent inorganic insulating film 30, for example, made of a silicon nitride, a silicon oxide or the like is laminated so as to cover the lower electrode 28. The transparent inorganic insulating film 30 is deposited at a lower temperature than that in each of the gate insulating film 22 and the interlayer insulating film 23 because the interlayer resin film 27 is weak against heat. Then, for the purpose of distinguishing the transparent inorganic insulating film 30 from each of the gate insulating film 22 and the interlayer insulating film 23 in the following description, the transparent inorganic insulating film 30 will be referred to as "a low temperature inorganic insulating film."

Also, an upper electrode 31 made of a transparent conductive material such as an ITO or an IZO is formed so as to cover the low temperature inorganic insulating film 30. The upper electrode 31 is connected to a common wiring (not shown) in a peripheral portion of the display area 12, and thus operates as a common electrode.

As shown in FIG. 2, plural slit-like openings 32 are formed in the upper electrode 31. After a photo resist material applied onto a surface of the upper electrode 31 is exposed and developed by using a photolithography method, the selective etching is carried out by using the resulting photo resist material as an etching mask, thereby forming these slit-like openings 32 in the upper electrode 31. Although an illustration is omitted, a first alignment film, for example, made of polyimide is laminated so as to cover the upper electrode 31 and the insides of the slit-like openings 32. The first alignment film is subjected to a liquid crystal direction alignment treatment, that is, a rubbing treatment in the Y-axis direction (in the direction approximately parallel with the extension direction of the signal line 18) of FIG. 2.

Plural V-shaped slit-like openings 32 each extending in the extension direction of the signal line 18 are formed at equal intervals in the upper electrode 31. Since the sub-pixel 16 is vertically long, when the slit-like openings 32 are made to transversely extend, the number of both ends of the slit-like openings 32 increases. The end portions of the slit-like openings 32 are the area of irregular alignment of the liquid crystal molecules. Then, in the liquid crystal display panel 10A of the first embodiment, as shown in FIG. 2, the extension direction of the slit-like opening 32 is set as the Y-axis direction, whereby the number of end portions of the slit-like openings 32 is reduced and a decrease in aperture ratio is reduced.

The extension direction of the slit-like opening 32 having the V-shape is inclined at about +5° and at about −5° with respect to the rubbing direction. When all the slit-like openings 32 are inclined either in a clockwise direction or in a counterclockwise direction with respect to the rubbing direction, a phenomenon appears such that the color changes depending on viewing angle directions because the liquid crystal molecules are twisted in the one direction. The reason for this is because an apparent retardation changes depending on the direction along which the liquid crystal molecules are seen. In order to reduce the phenomenon due to the change of the retardation, a domain in which the extension direction of the slit-like opening 32 is inclined at about +5° with respect to the clockwise direction, and a domain in which the extension direction of the slit-like opening 32 is inclined at about −5° with respect to the clockwise direction are provided in the liquid crystal display panel 11A of the first embodiment.

The color filter substrate CF has a second transparent substrate 33 made of a glass, quartz, a plastic or the like which is transparent and has an insulating property as a base. A light blocking layer 34 having a light blocking property is formed in a position facing the scanning line 17, the signal line 18, and the thin film transistor TFT on a lowermost layer (which means a layer firstly formed on the transparent substrate in the process for manufacturing the color filter substrate or the array substrate herein) of the second transparent substrate 33. Also, color filter layers 35 which transmit lights having different colors (R, G and B, or achromatic color), respectively, are formed in the three sub-pixels 16, respectively.

Also, an overcoat layer 36, for example, made of a transparent resin material such as a photo resist is laminated so as to cover both the light blocking layer 34 and the color filter layer 35. The overcoat layer 36 of the sub-pixel 16 is formed for the purpose of planarizing stepped portions caused by the color filter layers 35 having the different colors, respectively, and blocking an impurity outflowing either from the light blocking layer 34 or from the color filter layer 35 so as for such an impurity not to enter the liquid crystal layer LC. Also, although an illustration is omitted, a second alignment film, for example, made of polyimide is formed so as to cover the overcoat layer 36. The second alignment film is subjected to the rubbing treatment whose direction is opposite to that for the first alignment film.

With the structure described above, when the thin film transistor TFT is turned ON in the sub-pixel 16, an electric field is generated between the lower electrode 28 and the upper electrode 31, and thus the alignment of the liquid crystal molecules of the liquid crystal layer LC is changed. As a result, a light transmittance of the liquid crystal layer LC is changed, and thus the liquid crystal display panel 11A displays thereon an image in the FFS mode. In addition, an area in which the lower electrode 28 and the upper electrode 31 face each other through the low temperature inorganic insulating film 30 forms a subsidiary capacitor. The subsidiary capacitor thus formed holds the electric field generated between the lower electrode 28 and the upper electrode 31 for a predetermined period of time in and after the thin film transistor TFT is turned OFF.

Next, a description will be given with respect to an area 37 in which the low temperature inorganic insulating film 30 is absent. When as described above, the low temperature inorganic insulating film 30 is present which is laminated after completion of the lamination of the interlayer resin film 27, since the low temperature inorganic insulating film 30 is weak in adhesiveness, the possibility that the nibbles of the low temperature inorganic insulating film 30 are generated in the phase of the cutting-off, and the nibbles invade together with the liquid crystal from the liquid crystal inlet 14 into the display area 12 becomes high. In order to cope with this situation, in the liquid crystal display panel 11A of the first embodiment, as shown in FIG. 1, the area 37 in which the low temperature inorganic insulating film 30 is absent is provided in a portion of the scribe line SC of the liquid crystal inlet 14. The scribe line SC of the liquid crystal inlet 14 corresponds to a side on a liquid crystal inlet side of the present application. As a result, since the low temperature inorganic insulating film 30 having the weak adhesiveness is not formed in the liquid crystal inlet 14 portion, the nibbles of the low temperature inorganic insulating film 30 are prevented from invading from the liquid crystal inlet 14 into the display area 12 side. With the structure described above, it becomes possible to reduce the generation of the minute bright point defects.

It is noted that in the array substrate AR of the liquid crystal inlet 14 portion, as shown in FIG. 4, the films each having the insulating property of the sub-pixel 16 described above, that is, the buffer film 20, the gate insulating film 22, the interlayer insulating film 23, the passivation film 26, the interlayer resin film 27, and the low temperature inorganic insulating film 30 are laminated in this order on the surface of the first transparent substrate 19. The area 37 in which the low temperature inorganic insulating film 30 is absent has a width W of the liquid crystal inlet 14 in the Y-axis direction of FIG. 1, and is located at a distance L1 from the scribe line SC as shown in FIG. 4 as well in the X-axis direction of FIG. 1.

In this case, the distance L1 is set as being equal to or larger than about 120 μm. The position shift of the wheel cutter for grinding the groove for the cutting-off is up to 120 μm. Then, the area (removal area) 37 in which the low temperature inorganic insulating film 30 is absent is provided so as to be located at a distance of 120 μm or more from the scribe line SC, whereby even when the wheel cutter is shifted by up to 120 μm, the nibbles of the low temperature inorganic insulating film 30 can be prevented from being generated. In addition, since the low temperature inorganic insulating film 30 can prevent the impurity from outflowing from the interlayer resin film 27 underlying the low temperature inorganic insulating film 30, it is not preferable to remove the low temperature inorganic insulating film 30 more than necessary. For this reason, there is not removed the low temperature inorganic insulating film 30 in the scribe line SC on the both ends of a certain side having the liquid crystal inlet 14 of the liquid crystal display panel 11A, and in the scribe lines SC of other three sides.

It is noted that in the color filter substrate CF of the liquid crystal inlet 14 portion, as shown in FIG. 4, since the light blocking layer 34 and the overcoat layer 36 are formed in this order on the surface of the second transparent substrate 33 and no low temperature inorganic insulating film 30 is laminated, there is no removal area of the low temperature inorganic insulating film 30 in the color filter substrate CF.

Changes of First Embodiment

Figure 5A:
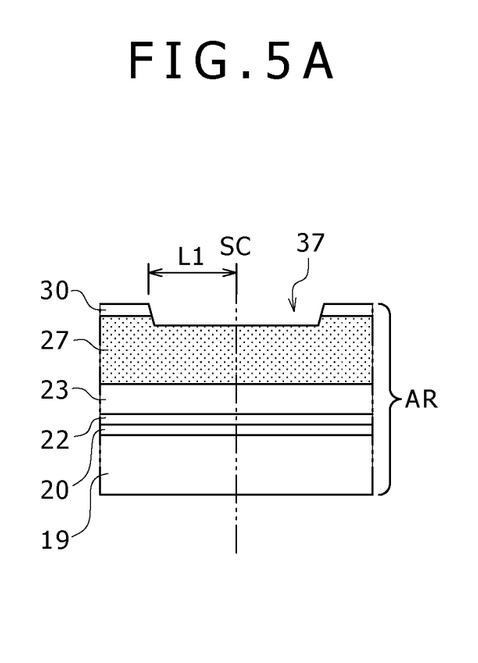
FIGS. 5A, 5B and 5C are a cross sectional view showing a first change of the array substrate in the liquid crystal display panel of the first embodiment, a cross sectional view showing a second change of the array substrate in the liquid crystal display panel of the first embodiment, and a cross sectional view showing a third change of the array substrate in the liquid crystal display panel of the first embodiment, respectively.

FIG. 5A is a cross sectional view showing a first change of the first embodiment. In the first change of the first embodiment, the passivation film 26 is removed away from the array substrate AR of the liquid crystal display panel 11A of the first embodiment. Since in the liquid crystal display panel 11A of the first embodiment described above, both the interlayer resin film 27 and the low temperature inorganic insulating film 30 are formed above the thin film transistor TFT, even when the passivation film 26 is removed away, no bad influence is exerted on the thin film transistor TFT. In the liquid crystal display panel 11A of the first embodiment, the passivation film 26 can be removed away in the manner described above, and thus the present application can be applied to the case as well of the liquid crystal display panel manufactured in such less processes.

Figure 5B:
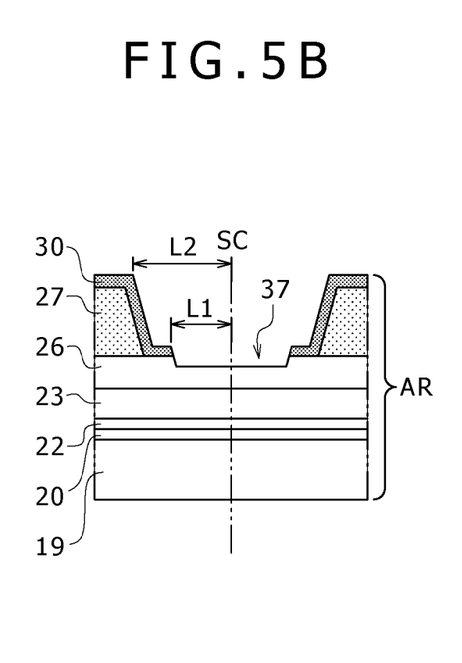

FIG. 5B is a cross sectional view showing a second change of the first embodiment. In the second change of the first embodiment, the interlayer resin film 27 is removed away from the array substrate AR in the first embodiment by a distance L2 from the scribe line SC. Since the low temperature inorganic insulating film 30 is weak in adhesiveness for the interlayer resin film 27, no interlayer resin film 27 is formed in the scribe line SC, whereby the low temperature inorganic insulating film 30 can be prevented from being peeled off by application of the stress to the interlayer resin film 27 in the phase of the cutting-off. In addition, although the low temperature inorganic insulating film 30 is weak in adhesiveness for the interlayer resin film 27, the low temperature inorganic insulating film 30 is strong in adhesiveness for the passivation film 26 because the low temperature inorganic insulating film 30 is made of the material having the same composition as that of the material of the passivation film 26. For this reason, the end portion of the low temperature inorganic insulating film 30 is bonded to the passivation film 26, whereby the end portion of the low temperature inorganic insulating film 30 can be hardly peeled off.

Figure 5C:
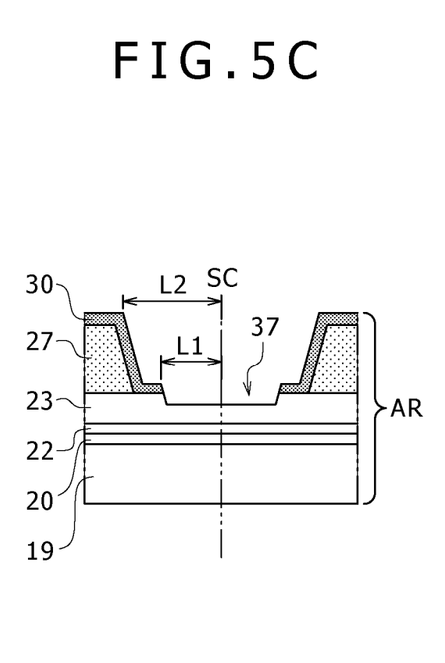

Here, it is preferable that L2>L1, and (L2−L1) is equal to or larger than about 80 μm. As (L2−L1) is larger, even when the wheel cutter is shifted at any time in the phase of the cutting-off, the wheel cutter and the low temperature inorganic insulating film 30 on the interlayer resin film 27 hardly contact each other, and the end portion of the low temperature inorganic insulating film 30 bonded to the interlayer resin film 27 is hardly peeled off. However, when the distance L2 is too large, the formation area for the interlayer resin film 27 is narrowed. It should be noted that FIG. 5C is a cross sectional view showing a third change of the first embodiment, and in the third change of the first embodiment, the second change of the first embodiment is applied to the first change of the first embodiment.

Second Embodiment

Figure 6:
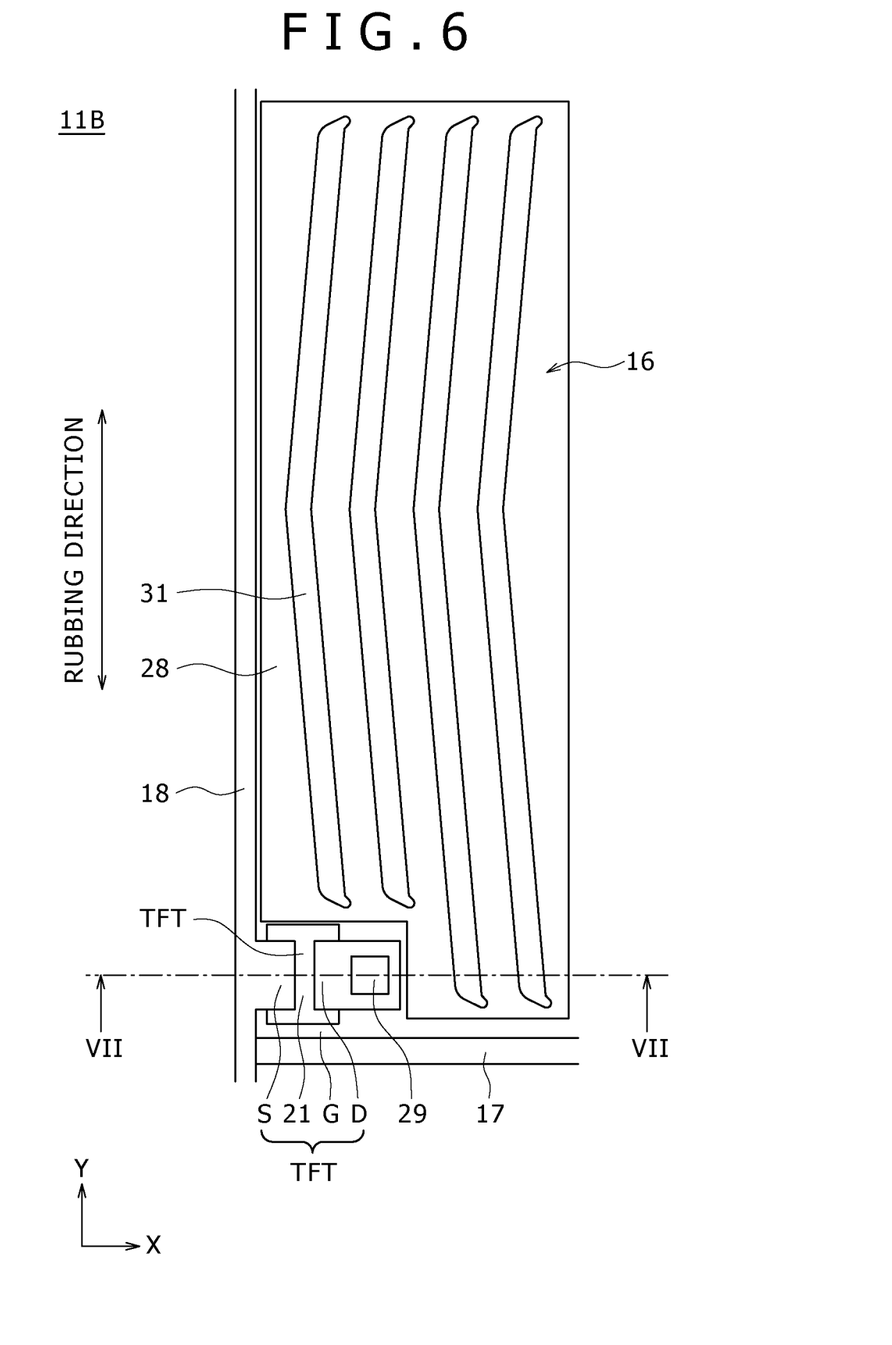
FIG. 6 is a top plan view showing one sub-pixel of a liquid crystal display panel according to a second embodiment.
Figure 7:
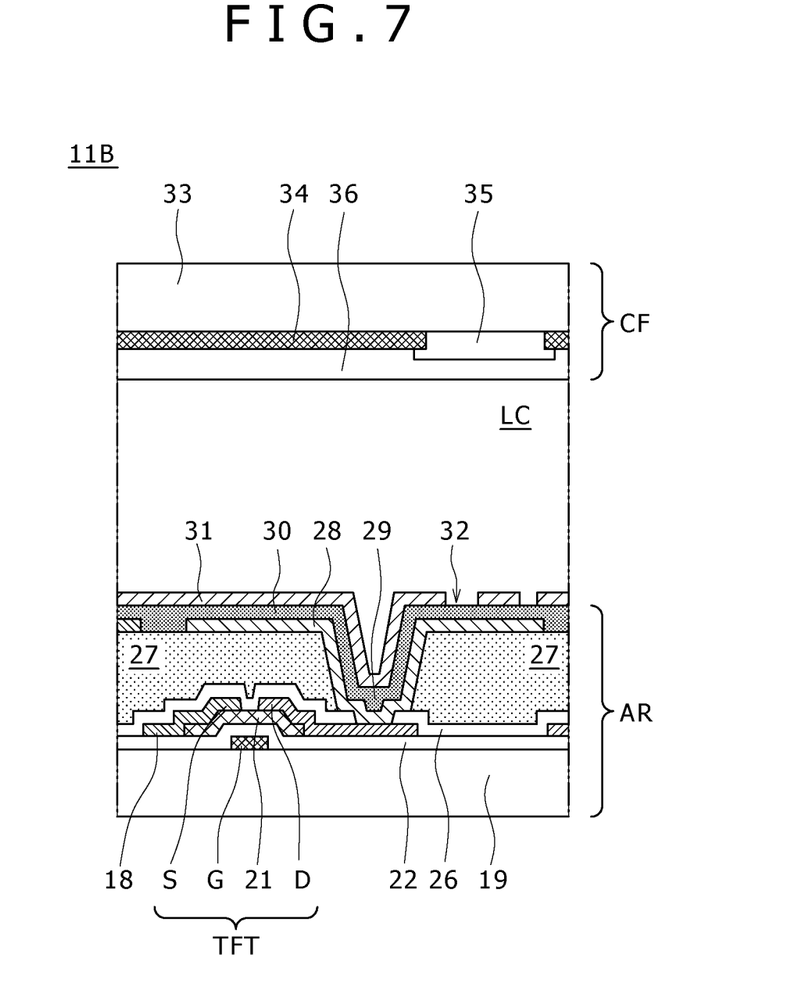
FIG. 7 is a cross sectional view taken on line VII-VII of FIG. 6.

Although the thin film transistor TFT in the liquid crystal display panel 11A of the first embodiment is of the low temperature poly silicon (LTPS) type, in a liquid crystal panel 11B of a second embodiment, the thin film transistor TFT is of an amorphous silicon (s-Si) type. An array substrate AR of the liquid crystal display panel 11B of the second embodiment will be described in detail hereinafter with reference to FIGS. 6 to 8. It is noted that, in FIGS. 6 to 8, constituent elements having the same structures as those of the array substrate AR of the liquid crystal display panel 11A of the first embodiment shown in FIGS. 2 to 4 are designated by the same reference numerals, respectively, for a description.

In the liquid crystal panel 11B of the second embodiment, the scanning line 17 is formed on the surface of the first transparent substrate 19 of the array substrate AR. The gate electrode G extends from the scanning line 17. The transparent gate insulating film 22 made of a silicon nitride, a silicon oxide or the like is laminated so as to cover both the scanning line 17 and the gate electrode G. Also, the semiconductor layer 21 made of a-Si is formed on the surface of the gate insulating film 22 which overlaps the gate electrode G in terms of the planar view. In addition, the plural signal lines 18 each made of a metal such as aluminum or molybdenum are formed on the surface of the gate insulating film 20. The source electrode S extends from each of these signal lines 18. The source electrode S partially contacts the surface of the semiconductor layer 21.

In addition, the drain electrode D which is made of the same material as that of each of the signal line 18 and the source electrode S concurrently with the formation of each of the signal line 18 and the source electrode S is formed on the surface the gate insulating film 22, and the drain electrode D is disposed close to the source electrode S to partially contact the surface of the semiconductor film 21. The thin film transistor TFT serving as the switching element is composed of the gate electrode G, the gate insulating film 22, the semiconductor layer 21, the source electrode S, and the drain electrode D. The thin film transistors TFT are formed in the respective sub-pixels 16.

In addition, the transparent passivation film 26, for example, made of a silicon nitride, a silicon oxide or the like is laminated so as to cover the signal line 18, the thin film transistor TFT and an exposed portion of the gate insulating film 22. Also, the interlayer resin film 27, for example, made of the transparent resin material such as a photo resist is laminated so as to cover the passivation film 26. Also, the lower electrode 28 made of the transparent conductive material such as an Indium Tin Oxide (ITO) or an Indium Zinc Oxide (IZO) is formed so as to cover the interlayer resin film 27. The contact hole 29 for the pixel electrode is formed so as to extend completely through both the interlayer resin film 27 and the passivation film 26 to reach the drain electrode D. The lower electrode 28 and the drain electrode D are electrically connected to each other through the contact hole 29 for the pixel electrode. For this reason, the lower electrode 28 operates as the pixel electrode.

The transparent low temperature inorganic insulating film 30, for example, made of a silicon nitride, a silicon oxide or the like is laminated so as to cover the lower electrode 28. Also, the upper electrode 31 made of the transparent conductive material such as an ITO or an IZO is formed so as to cover the low temperature inorganic insulating film 30. The upper electrode 31 is connected to the common wiring (not shown) in the peripheral portion of the display area 12, and thus operates as the common electrode. As shown in FIG. 2, the plural slit-like openings 32 are formed in the upper electrode 31. Although an illustration is omitted, the first alignment film made of polyimide is laminated so as to cover the upper electrode 31. The first alignment film is subjected to the liquid crystal direction alignment treatment in the Y-axis direction (in the direction approximately parallel with the extension direction of the signal line 18) of FIG. 2, that is, the rubbing treatment.

Figure 8:
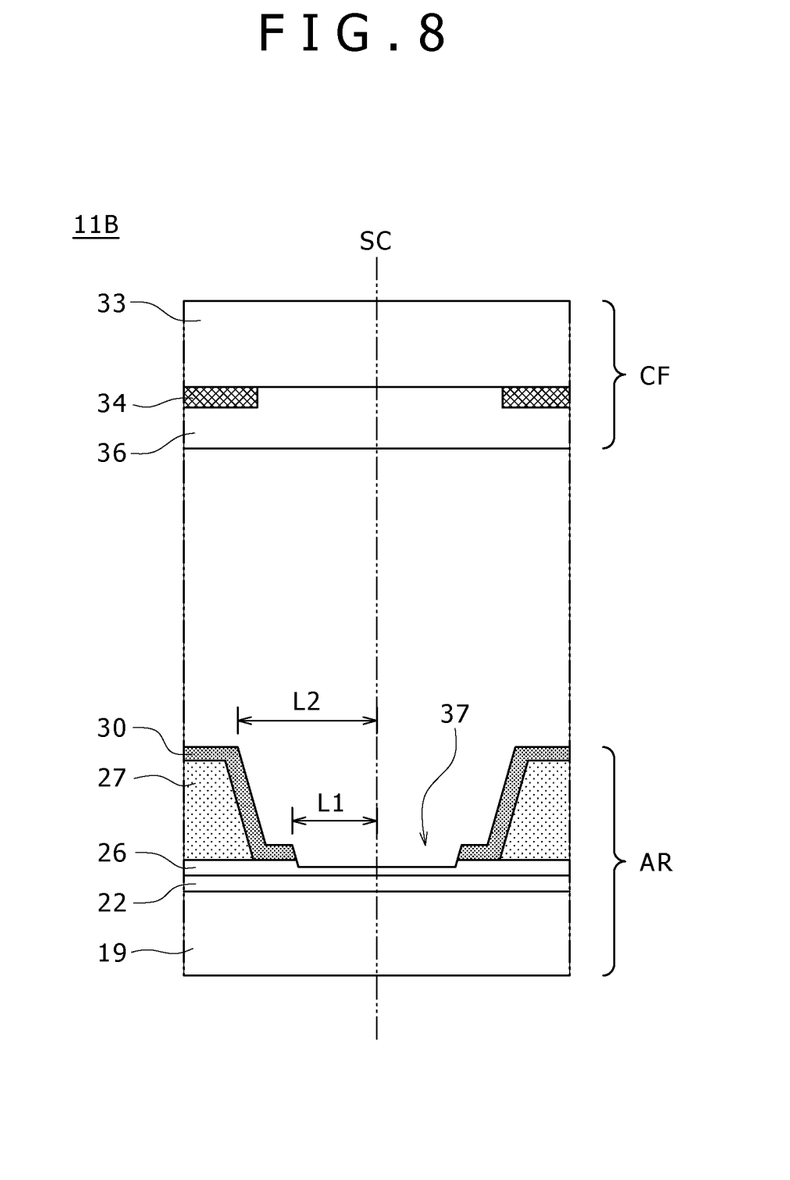
FIG. 8 is a cross sectional view of a portion in the liquid crystal display panel of the second embodiment, and taken on line IV-IV of FIG. 1.

Next, a description will be given with respect to the area 37 in which the low temperature inorganic insulating film 30 is absent. The liquid crystal display panel 11B of the second embodiment also has the area 37, in which the low temperature inorganic insulating film 30 is absent, similarly to the case of the liquid crystal display panel 11A of the first embodiment because the low temperature inorganic insulating film 30 which is laminated after completion of the lamination of the interlayer resin film 27 is present similarly to the case of the liquid crystal display panel 11A of the first embodiment. In the array substrate AR of the liquid crystal inlet 14 portion, as shown in FIG. 8, the films each having the insulating property of the sub-pixel 16 described above, that is, the gate insulating film 22, the passivation film 26, the interlayer resin film 27, and the low temperature inorganic insulating film 30 are laminated in this order on the surface of the first transparent substrate 19. Also, as with the case of the second change of the first embodiment, the low temperature inorganic insulating film 30 is removed away by the distance L1 from the scribe line SC, and the interlayer resin film 27 is removed away by the distance L2 from the scribe line SC. As a result, in the liquid crystal display panel 11B as well of the second embodiment, the generation of the minute bright point defects can be reduced similarly to the case of the liquid crystal display panel 11A of the first embodiment.

Changes of Second Embodiment

Figure 9A:
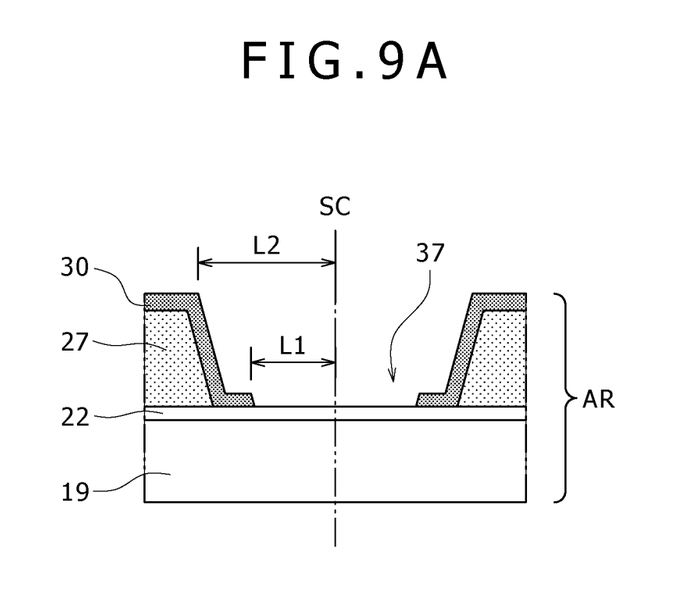
FIGS. 9A and 9B are a cross sectional view showing a first change of the array substrate in the liquid crystal display panel of the second embodiment, and a cross sectional view showing a second change of the array substrate in the liquid crystal display panel of the second embodiment, respectively.

FIG. 9A is a cross sectional view showing a first change of the second embodiment. In the first change of the second embodiment, the passivation film 26 is removed away from the array substrate AR, shown in FIG. 8, of the liquid crystal display panel 11A of the second embodiment. Since in the liquid crystal display panel 11B of the second embodiment described above, both the interlayer resin film 27 and the low temperature inorganic insulating film 30 are formed above the thin film transistor TFT, even when the passivation film 26 is removed away, no bad influence is exerted on the thin film transistor TFT. Thus, in the liquid crystal display panel 11B of the second embodiment, the passivation film 26 can be removed away in the manner described above, and thus the present application can be applied to the case as well of the liquid crystal display panel manufactured in such less processes.

Figure 9B:
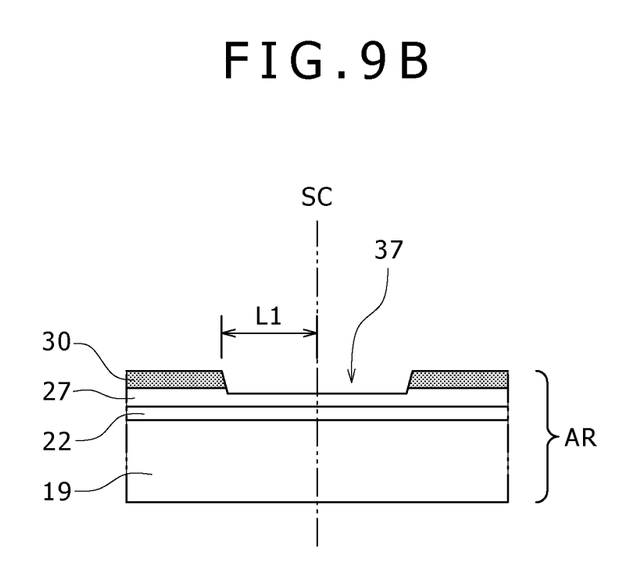

FIG. 9B is a cross sectional view showing a second change of the second embodiment. In the second change of the second embodiment, the interlayer resin film 27 is removed away from the array substrate AR, shown in FIG. 8, of the second embodiment. Even when the interlayer resin film 27 laminated on the sub-pixel 16 is not laminated on the liquid crystal inlet in such a manner, the generation of the minute bright point defects can be reduced because the adhesiveness of the low temperature inorganic insulating film 30 for the gate insulating film 22 is higher than that of the low temperature inorganic insulating film 30 for the interlayer resin film 27.

It is noted that in each of the liquid crystal display panels of the embodiments described above, the description has been given with respect to the case where the upper electrode operates as the common electrode and the lower electrode operates as the pixel electrode. However, the present application can be applied to the case as well where the upper electrode operates as the pixel electrode and the lower electrode operates as the common electrode. In addition, although in each of the embodiments described above, the interlayer resin film planarizes the irregularities of the thin film transistor and the like, and the low temperature inorganic insulating film is the insulating film disposed between the lower electrode and the upper electrode, the present application is by no means limited to the interlayer resin film and the low temperature inorganic insulating film for these use applications, and thus the present application can be applied to a liquid crystal display panel having a low temperature resin film which is formed at a low temperature after completion of formation of the resin film.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A liquid crystal display panel in which circumferences of a pair of substrates disposed so as to face each other are stuck at a given distance to each other by a seal material, a liquid crystal inlet is formed in a part of said seal material, and a liquid crystal is sealed in an inner space defined between said substrates paired with each other, said liquid crystal display panel comprising:
   a resin film being formed on the inner space side of one of said pair of substrates, and an inorganic insulating film being formed on a surface side of said resin film;
   wherein an area not having said inorganic insulating film being present therein is formed in an end portion corresponding to the liquid crystal inlet of said liquid crystal panel, and
   wherein a width of said area not having said inorganic insulating film being present therein is larger than 120 µm and
   wherein a length of the area not having the inorganic insulating film being present therein is longer than a width of the liquid crystal inlet formed on a scribe line, but shorter than a length of the scribe line corresponding to unit length of a panel forming area.

2. The liquid crystal display panel according to claim 1, wherein said area not having said inorganic insulating film being present therein is formed over a predetermined given width from said end portion of said liquid crystal inlet.

3. The liquid crystal display panel according to claim 1, wherein said resin film is not formed in a side on the liquid crystal inlet side of said liquid crystal display panel.

4. The liquid crystal display panel according to claim 3, wherein a width of a portion not having said resin film formed therein is wider than that of said area not having said inorganic insulating film being present therein from said side on the liquid crystal inlet side.

5. The liquid crystal display panel according to claim 1, wherein a lower electrode, said inorganic insulating film and an upper electrode are formed in this order on said resin film.

6. The liquid crystal display panel according to claim 1, wherein the width of the area not having the inorganic insulating film being present therein from a scribe line is wider than 120 µm.

* * * * *